United States Patent
Matsakis

(10) Patent No.: US 9,621,689 B2
(45) Date of Patent: Apr. 11, 2017

(54) SYSTEM AND METHOD FOR AUTHENTICATING A NETWORK TIME PROTOCOL (NTP)

(71) Applicant: Demetrios Nicholas Matsakis, Silver Spring, MD (US)

(72) Inventor: Demetrios Nicholas Matsakis, Silver Spring, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 36 days.

(21) Appl. No.: 14/453,388

(22) Filed: Aug. 6, 2014

(65) Prior Publication Data

US 2016/0043865 A1 Feb. 11, 2016

(51) Int. Cl.
*H04L 29/06* (2006.01)
*H04L 9/32* (2006.01)

(52) U.S. Cl.
CPC .......... *H04L 69/28* (2013.01); *H04L 9/3247* (2013.01); *H04L 63/0428* (2013.01)

(58) Field of Classification Search
CPC ....... H04L 9/32; H04L 63/0428; H04L 67/42; H04L 69/28; H04L 9/3247
See application file for complete search history.

(56) References Cited

U.S. PATENT DOCUMENTS

| | | | |
|---|---|---|---|
| 2004/0073718 A1* | 4/2004 | Johannessen | G04G 7/00 713/375 |
| 2010/0153742 A1* | 6/2010 | Kuo | H04L 63/04 713/189 |
| 2014/0064303 A1* | 3/2014 | Aweya | H04J 3/0667 370/509 |

* cited by examiner

*Primary Examiner* — Mahfuzur Rahman
*Assistant Examiner* — Narcisco Victoria
(74) *Attorney, Agent, or Firm* — U.S. Naval Research Laboratory; William Ladd

(57) ABSTRACT

System and method for determining the updating time by a server presumed to have a correct time and a client needing a correct time. The server can first transmit an unencrypted signal, which may be signed or unsigned. The server can then later encrypt or sign the same packet it transmitted with a private key and transmit it to the client. After the client receives the unencrypted packet, the client can compute a time difference. However the client doesn't update its time until a follow-up packet is received from the server. If encrypted, the packet is decoded with the server's public key, and the decoded packet is shown identical to the received packet and that the identification bits are the same.

17 Claims, 8 Drawing Sheets

SYSTEM AND METHOD FOR AUTHENTICATING A NETWORK TIME PROTOCOL (NTP)

CROSS-REFERENCE TO RELATED APPLICATIONS

None.

BACKGROUND

Methods and systems disclosed herein relate generally to synchronizing data across a network and more generally to authenticating a Network Time Protocol (NTP). NTP is a User Datagram Protocol-based protocol used to synchronize time clocks among network devices. NTP is standards-based and defined in RFC 5905, Network Time Protocol Version 4, June 2010, http://tools.ietf.org/html/rfc5905 (RFC 5905). According to RFC 5905, "The [NTP] implementation model . . . is based on a threaded, multi-process architecture, although other architectures could be used as well. The on-wire protocol . . . is based on a returnable-time design that depends only on measured clock offsets, but does not require reliable message delivery. Reliable message delivery such as TCP can actually make the delivered NTP packet less reliable since retries would increase the delay value and other errors. The synchronization subnet is a self-organizing, hierarchical, master-slave network with synchronization paths determined by a shortest-path spanning tree and defined metric. While multiple masters (primary servers) may exist, there is no requirement for an election protocol." (RFC 5905, p. 4) Since NTP is used to ensure accurate timestamp information, NTP can pose a security risk. If malicious users were able to falsify NTP information passed over the network, timestamp information could be falsified to the advantage of the malicious user. In order to deal with this vulnerability, NTP optionally implements an authentication mechanism. Authentication can be a digital signature that doesn't include data encryption. A data packet including the time plus a key can be used to build a non-reversible magic number that can be appended to the packet. The client that has the same key does the same computation done by the server to create the data packet, and then compares the result. If the results match, authentication succeeded. This type of authentication can protect the client from hackers and spoofers who set up servers that claim to be a recognized authority, such as the U.S. Naval Observatory or the National Institute of Standards and Technology, but instead are giving out a false representation of the time. The simplest method to provide authentication would be for the server to fully encrypt the packet responses with a private key. The client could then apply the server's public key to decrypt the packet; this could be achieved by many means including those currently used for financial transactions on the internet. Unfortunately it has been shown that such systems are not applicable to NTP because the time and CPU resources involved in encrypting and decrypting are large enough to distort the response and to increase the time transfer errors to an unacceptable level. Therefore encryption has been abandoned in favor of the simple authentication previously described.

What is needed is a system in which complex schemes for key transmission need not be applied in real-time, or even applied at all. What is further needed is a system similar to those currently used by the financial sector in which there is no need to sign or authenticate the initial packet sent by the server.

SUMMARY

The system and method of the present embodiment can determine the time difference between two computers, which are designated a server computer and a client computer. The server computer is presumed to have the correct time, and the client computer is presumed to need the correct time. In the present embodiment, the client computer can begin by sending an NTP packet request to the server computer. In an alternate embodiment, the server computer can broadcast a server time without being prompted by the client computer. The NTP packet can include the time of transmission and could also include self-generated identification-bits chosen to be relatively unpredictable to outsiders. The server computer can respond with a server packet that can embed any received identification bits and optional server-added identification bits along with the information normally part of an NTP packet, including the received time of client transmission, the time of reception at the server, and the time of retransmission by the server. To sidestep the delay issue, the server can first transmit an unencrypted signal, which may be signed or unsigned. The server can then later encrypt or sign the same packet it transmitted with a private key and transmit it to the client. After the client receives the unencrypted packet, the client can compute a time difference. However, the client doesn't update its time until a follow-up packet is received from the server. If encrypted, the packet is decoded with the server's public key, and the decoded packet is shown identical to the received packet and that the identification bits are the same. If the server's follow-up packet is signed, the client verifies the initial packet against the signed packet.

Alternatively, the encrypted version can be sent from a second server associated with the first server, for example, an identical outgoing packet can be sent from the second server that is directly connected to the first server, or alternatively connected by a switch or router along the outgoing path. The second server can either be sent a copy of the original packet, or can read and retransmit it. The second server can send the encrypted packet to the client. This separation of functions among multiple servers could improve the time transfer accuracy.

The method of the present embodiment for minimizing delay in updating a client time at a client computer can include, but is not limited to including, receiving, by the client computer, set-up information including options from a server computer. The method can also include receiving, by the client computer, default values from a server computer. The method can further include transmitting, by the client computer to the server computer, a client packet including client identification information, timing information, and selected ones of the options. If in broadcast mode, the client's step of transmitting can be omitted. The method can still further include receiving, by the client computer, a server packet including at least one server time and at least one retransmission time that are formatted according to the selected options, and computing, by the client computer, a time difference between the at least one server time and the client time. The method can also include receiving, by the client computer, a secure version of the server packet. The secure version can include at least one secure time. The method can also include updating, by the client computer, the time based on the time difference only if the at least one secure time and the at least one server time match.

The options can optionally include a time format, a security option, and commercially-available packages. The security option can include an encryption method and a decryption key. The method can optionally include decrypting the secure version according to the decryption key. The decrypted secure version can include decrypted client information. The method can further optionally include updating, by the client computer, the time based on the time difference only if the decrypted time and the received time match, and if the received client identification information and the decrypted client identification information match. The server packet can optionally be signed, and the method can further optionally include verifying the server packet against the signed server packet. The method can further optionally include receiving, by the client computer, the secure version of the server packet from a first server computer and the secure packet from a second server computer. The first server computer and the second server computer are related by means such as, for example, but not limited to, direction connection or switch/router feed. The method can still further optionally include updating, by the client computer, the client time based on the time difference only if the client time and the server time match, and all other information in the secure version and the server packet match. The method can further optionally include indicating, by the client computer, a possible spoof when the secure version and the server packet do not match.

DETAILED DESCRIPTION

The problems set forth above as well as further and other problems are solved by the present teachings. These solutions and other advantages are achieved by the various embodiments of the teachings described herein below. The system and method of the present embodiment automatically minimize delay in updating time at a client computer.

Figure 1:
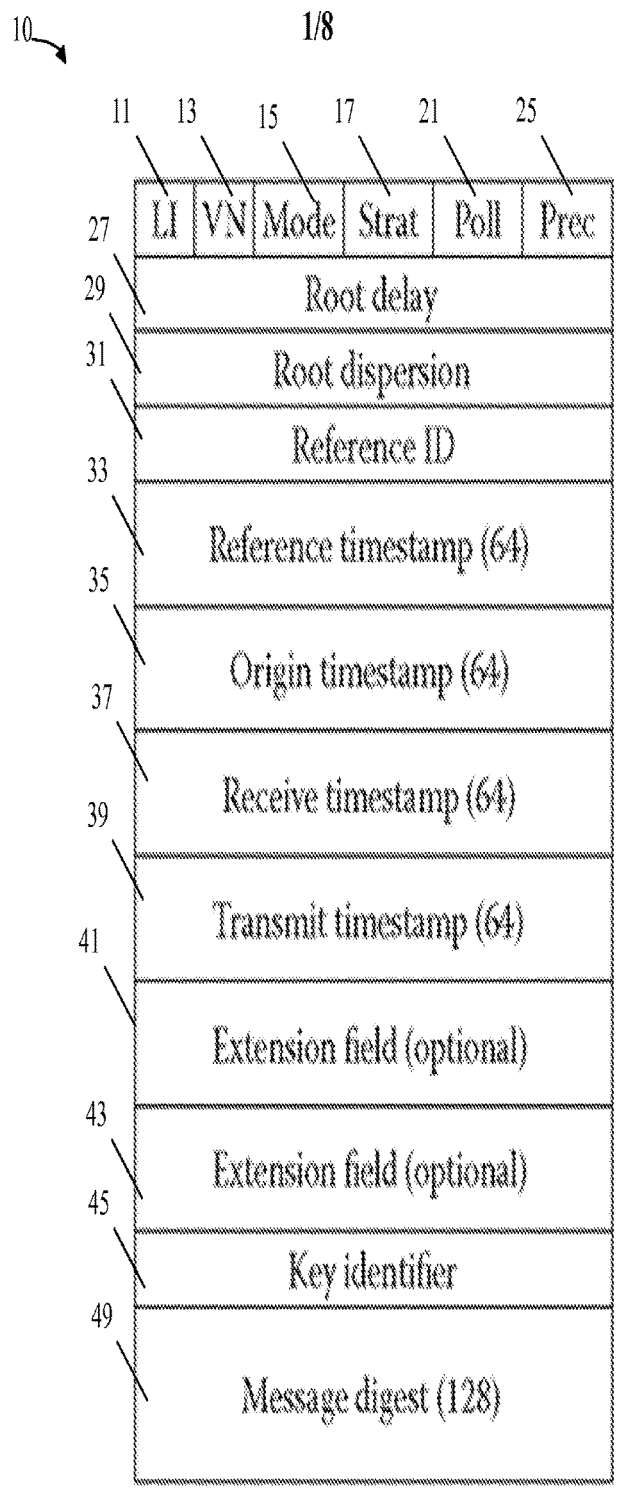
FIG. 1 is a NTP packet format according to NTP version 4.

Referring now to FIG. 1, NTP version 4 packet 10 is a User Datagram Protocol (UDP) datagram including a basic header—leap indicator 11, version number 13, mode 15, stratum 17, poll exponent 21, precision exponent 25, root delay 27, root dispersion 29, reference identification 31, reference timestamp 33, origin timestamp 35, receive timestamp 37, and transmit timestamp 39. NTP packet 10 also includes optional extension fields 41 and 43 including, for example, but not limited to, a destination timestamp. Finally, NTP packet includes an optional message authentication code including key identification 45 and message digest field 49. Leap indicator 11 warns of an impending leap second, version number 13 is the NTP version number, and mode 15 indicates, among other things, whether or not NTP packet 10 is part of a time broadcast. Stratum 17 indicates the reliability of the time source, poll 21 is the maximum interval between successive messages, and precision is the precision of the system clock of the computer creating NTP packet 10. Root delay 27 is the total round-trip delay to the reference clock, root dispersion 29 is the total dispersion to the reference clock, reference identification 31 identifies a particular server computer or reference clock, and reference timestamp 33 is the time when the system clock of the system identified by reference identification 31 was last set or corrected. Origin timestamp 35 is the time at the client computer when the request departed for the server computer, receive timestamp 37 is the time at the server computer when the request arrived from the client computer, and transmit timestamp 39 is the time at the server computer when the response left for the client computer. Destination timestamp, possibly located in optional extension field 41, is the time at the client computer when the reply arrived from the server computer. Destination timestamp is determined upon arrival of NTP packet 10. Key identifier 45 is used by the client and server computers to designate a secret 128-bit MD5 algorithm key defined in RFC 1321 and used to verify data integrity. Message digest 49 is calculated over the NTP header and optional extension fields, but not including key identifier 45 and message digest 49.

Figure 2:
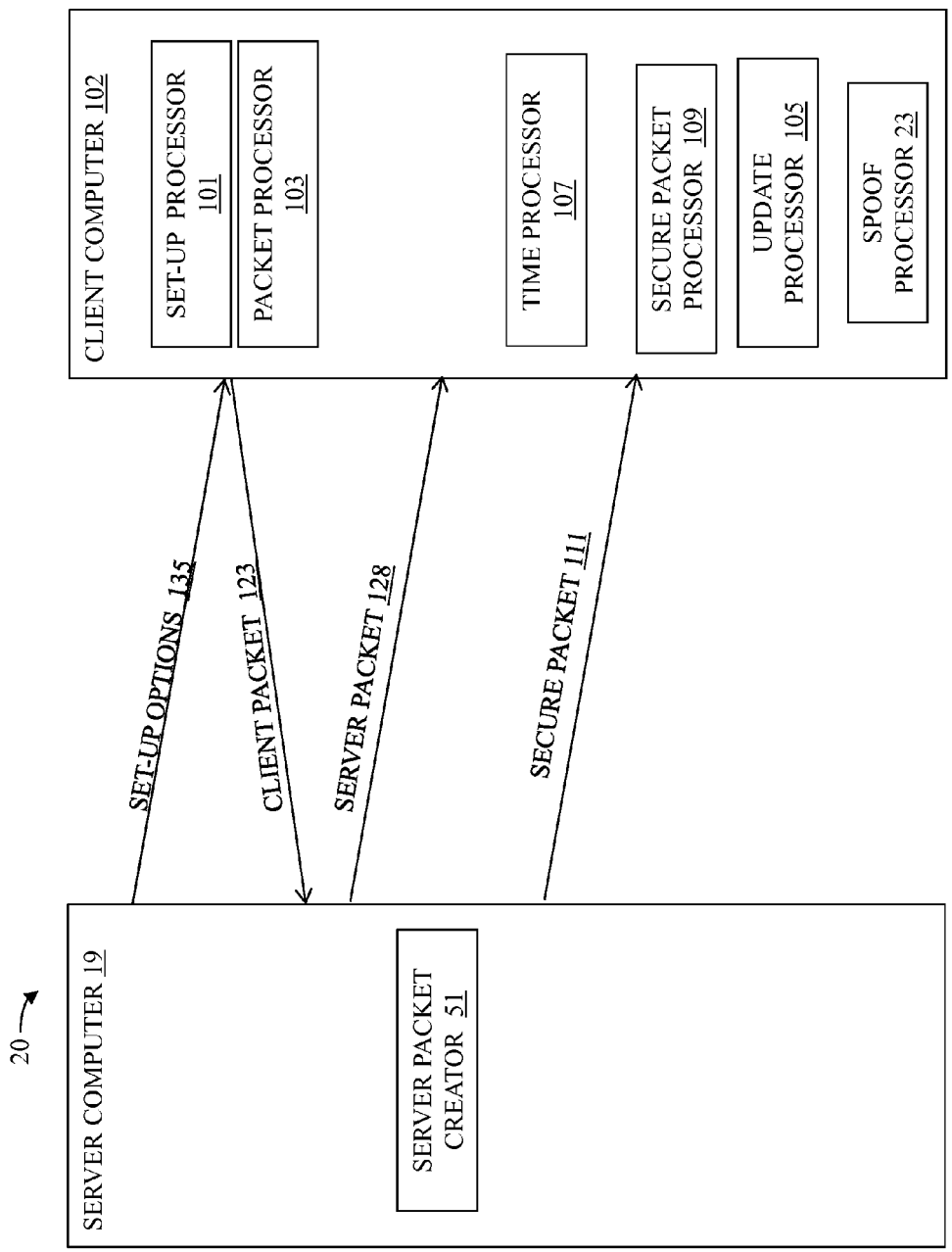
FIG. 2 is a schematic block diagram of a protocol between server computer and client computer of an embodiment of the present teachings.

Referring now to FIG. 2, protocol 20 can include, but is not limited to including, server computer 19 sending set-up options 135 to client computer 102, which executes set-up processor 101 receiving and processing set-up options 135 including, for example, but not limited to, a security option and a time format. Packet processor 103 sends client packet 123 that is a time request, and that can include, but is not limited to including, NTP packet 10 (FIG. 1) including origin timestamp 35 (FIG. 1), and client identification information. Server packet creator 51 creates and sends server packet (or packets) 128 that can include, but is not limited to including, client identification information, server identification information, NTP packet 10 (FIG. 1) including receive timestamp 37 (FIG. 1) and transmit timestamp 39 (FIG. 1). Time processor 107 computes, by client computer 102, a time difference between client time 131 (FIG. 7) and at least one of the server times (receive timestamp 37 (FIG. 1) and transmit timestamp 39 (FIG. 1)). The measured time difference is calculated as 0.5*(SR+ST−CR−CT), where SR is receive timestamp 37 (FIG. 1), ST is transmit timestamp 39 (FIG. 1), CR is the destination timestamp, and CT is origin timestamp 35 (FIG. 1). Secure packet processor 109 receives secure packet 111 which is an encrypted and optionally signed version of server packet 128. Secure packet processor 109 decodes secure packet 111 with a public key and compares server packet 128 with the unencrypted version of secure packet 111. Identification bits can be compared as well. If secure packet 111 and server packet 128 are signed, secure packet processor verifies the signatures. Should the packets pass verification test, update processor 105 can compute an updated time 119 (FIG. 7) by updating the client time 131 (FIG. 7) based on the measured time difference and via the client's time computation system's parameters. If the packets do not pass verification tests, spoof processor 23 can test for spoofing and can set spoof indication 127 (FIG. 7) if a spoof has been attempted.

Figure 3:
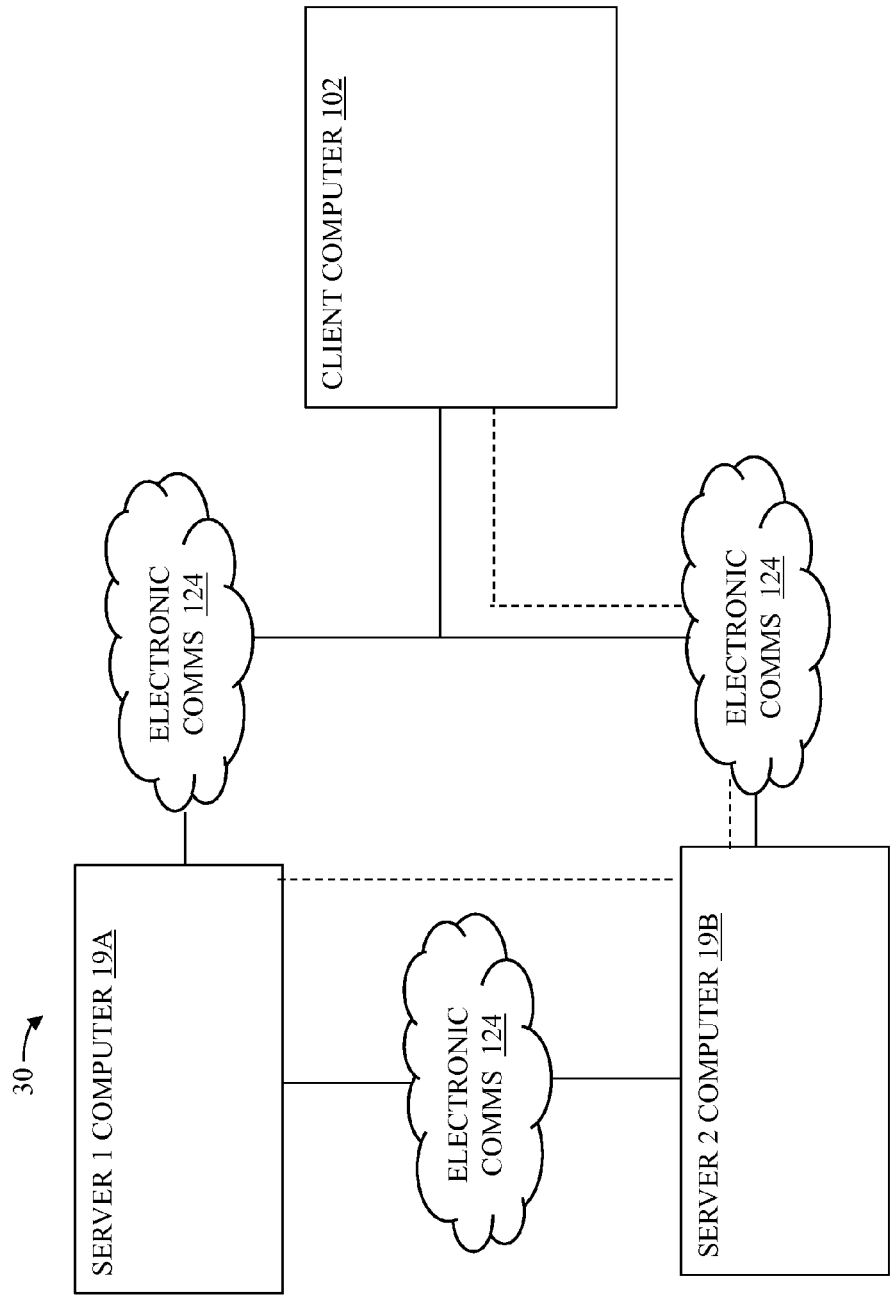
FIG. 3 is a schematic block diagram of a configuration for an alternate embodiment of the present teachings.

Referring now to FIG. 3, in an alternative embodiment, in configuration 30, server 1 computer 19A sends server packet 128 (FIG. 2) to client computer 102. Processing as above occurs in client computer 102. However, the subsequent transmission of secure packet 111 is generated by server 2 computer 19B and sent to client computer 102. Server 1 computer 19A can have a relationship with server 2 computer 19B such as, for example, but not limited to, being directly wired to server 2 computer 19B as indicated in FIG. 3 by dashed lines, or can involve some form of electronic communications 124 such as a router.

Figure 4:
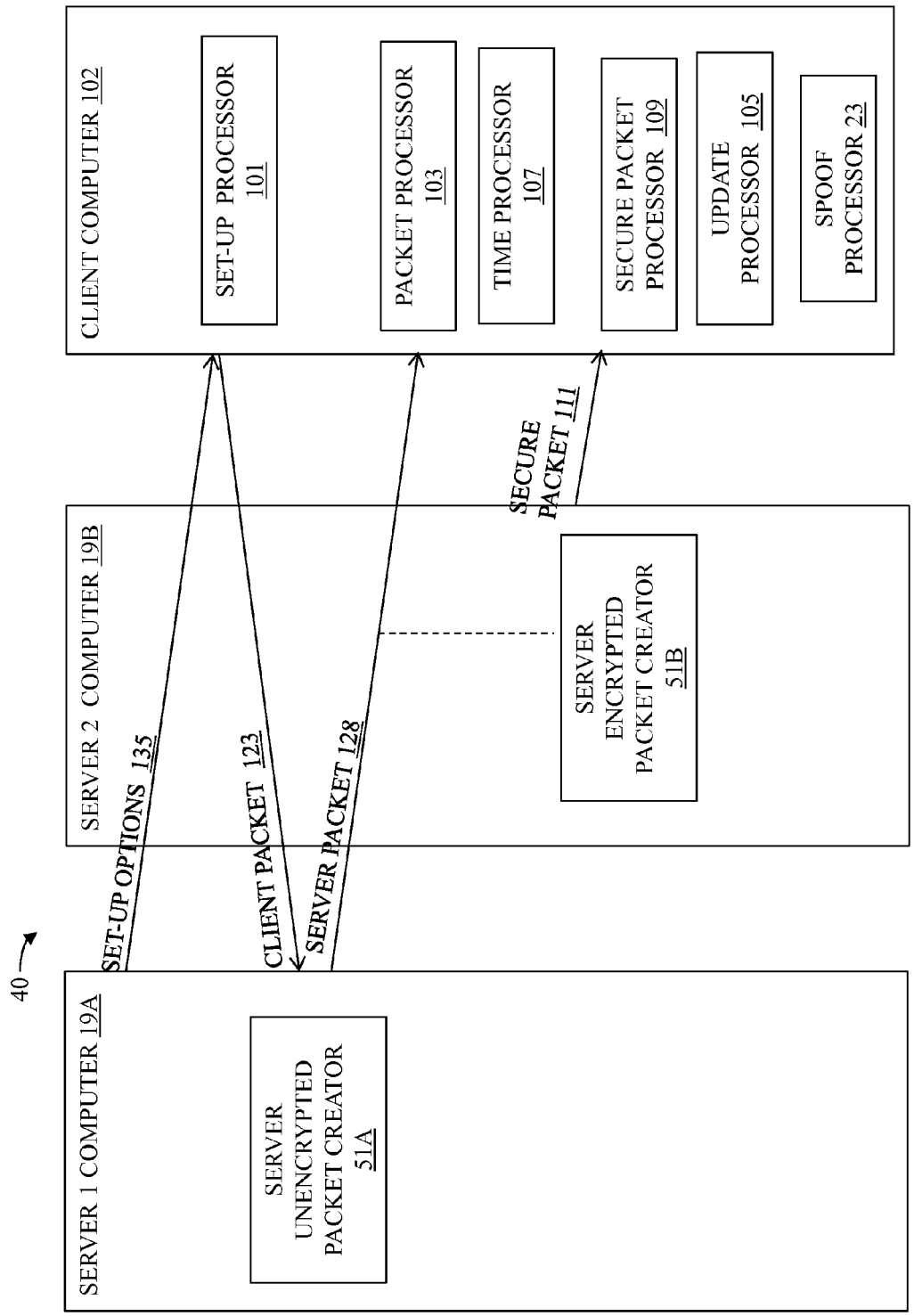
FIG. 4 is a schematic block diagram of a protocol between server computer and client computer of another embodiment of the present teachings.

Referring now to FIG. 4, protocol 40, which operates in the context of configuration 30 (FIG. 3), can include, but is not limited to including, more than one server—server 1 computer 19A and server 2 computer 19B in the depicted embodiment—and client computer 102. In protocol 40, server 1 computer 19A sends set-up options 135 to client computer 102 which processes are similar to client computer 102 processes in protocol 20 (FIG. 2). However, server 1 computer 19A executes server unencrypted packet creator 51A to send server packet 128 to client 102, which server 2 computer 19B executes server encrypted packet creator 51B to send secure packet 111 to client 102. Server 1 computer 19A can also share server packet 128 with server 2 computer 19B, forming a relationship between server 1 computer 19A and server 2 computer 19B.

Figure 5:
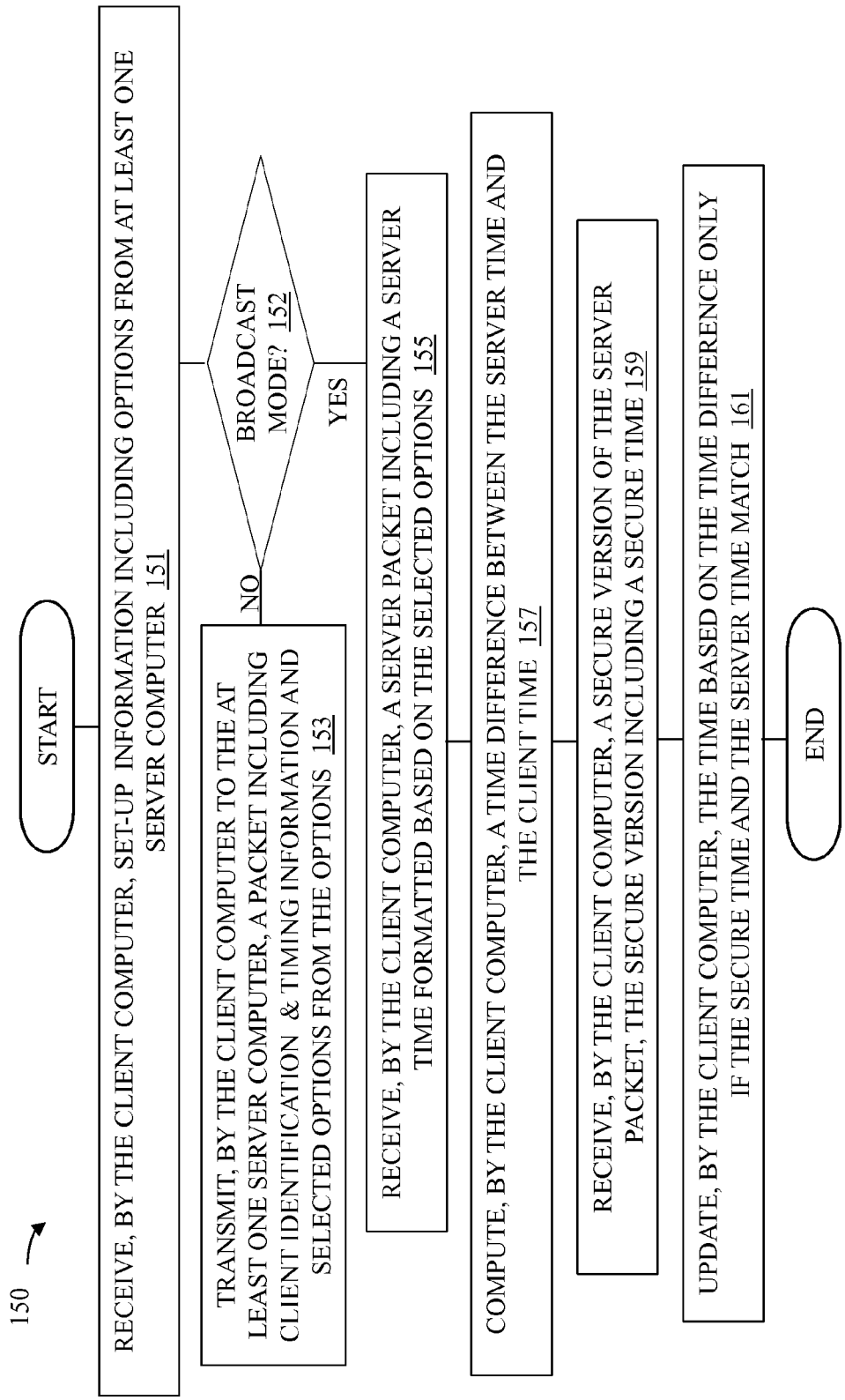
FIG. 5 is a flowchart of one embodiment of the method of the present teachings.

Referring now to FIG. 5, method 150 of the present embodiment can include, but is not limited to including, receiving 151, by the client computer, set-up information including options and possibly defaults from at least one server computer. The options could, for example, but not limited to, be indirectly available via such means as public web pages or internal computation. Method 150 can also include transmitting 153, by the client computer to at least one server computer, a client packet including client identification information, timing information, and selected options from the options. If 152 the server computer is operating in broadcast mode, no transmitting step is required from the client. Method 150 can also include receiving 155, by the client computer, a server packet including at least one server time formatted based on the selected options and possibly the default options, computing 157, by the client computer, a time difference between the at least one server time and the client time, receiving 159, by the client computer, a secure version of the server packet, the secure version including secure time data, and updating 161, by the client computer, the client time based on the time difference only if the secure time data and the server data associated with at least one server time match.

Figure 6:
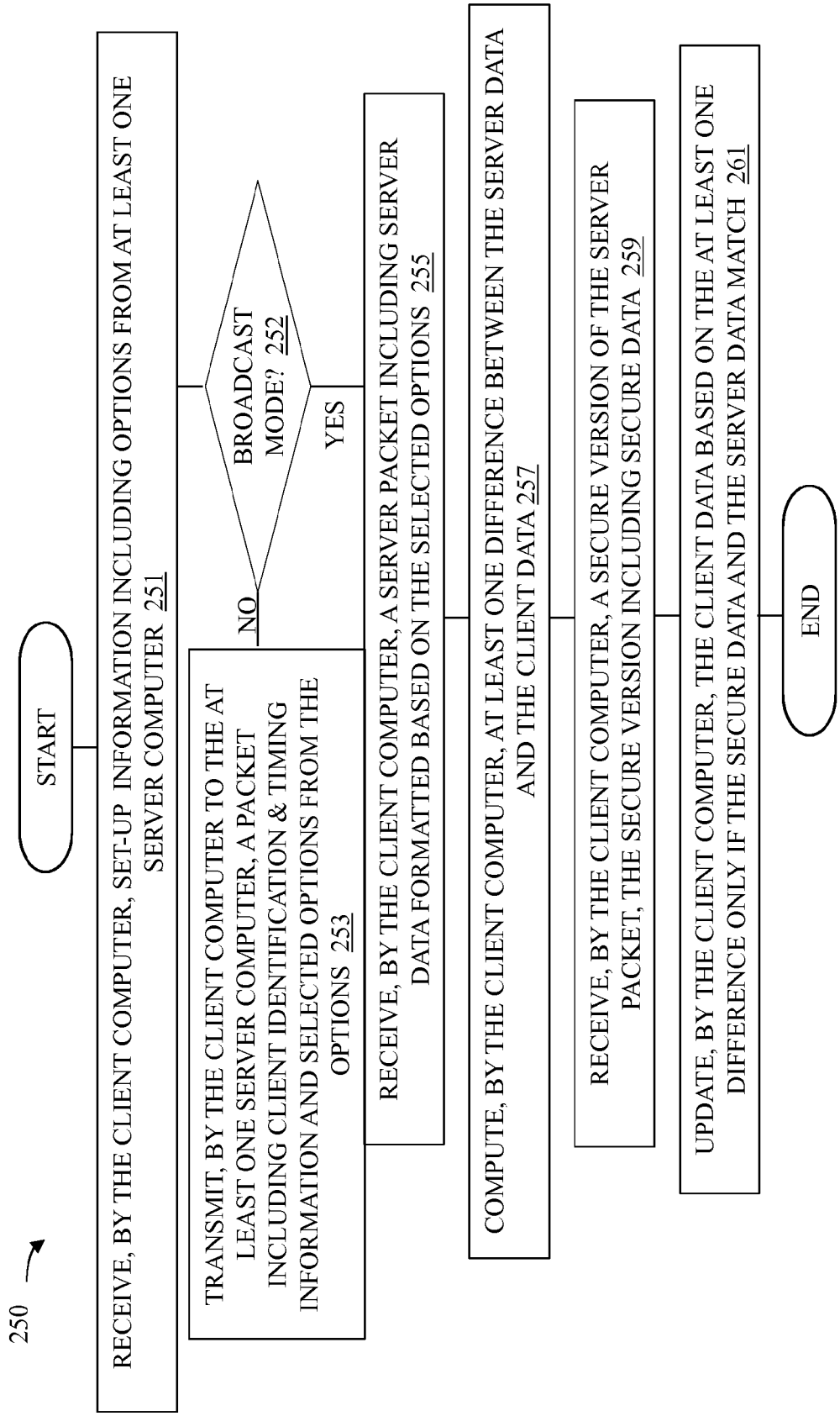
FIG. 6 is a flowchart of an alternate embodiment of the method of the present teachings.

Referring now to FIG. 6, method 250 for circumventing spoofing of time-critical data can include, but is not limited to including, receiving 251, by the client computer, set-up information including options from at least one server computer. The options could, for one example, be indirectly available via such means as public web pages or internal computation. Method 250 can also include transmitting 253, by the client computer to at least one server computer, a client packet including client identification information, timing information, and selected options from the options. If 252 the server computer is operating in broadcast mode, no transmitting step by the client is required. Method 250 can also include receiving 255, by the client computer, a server packet including server data formatted based on the options or the selected options, computing 257, by the client computer, at least one difference between the server data and the time-critical data, receiving 259, by the client computer, a secure version of the server packet, the secure version including secure time-critical data, and updating 261, by the client computer, the time-critical data based on the at least one difference only if the secure data and the server data match. The options can include an encryption method and a decryption key. Method 250 can optionally include decrypting the secure version according to the decryption key, the decrypted secure version including decrypted client information, updating, by the client computer, the data based on the at least one difference only if the decrypted data and the server data match, and if the received client identification information and the decrypted client identification information match, and indicating, by the client computer, a possible spoof when the secure version and the server packet do not match.

Figure 7:
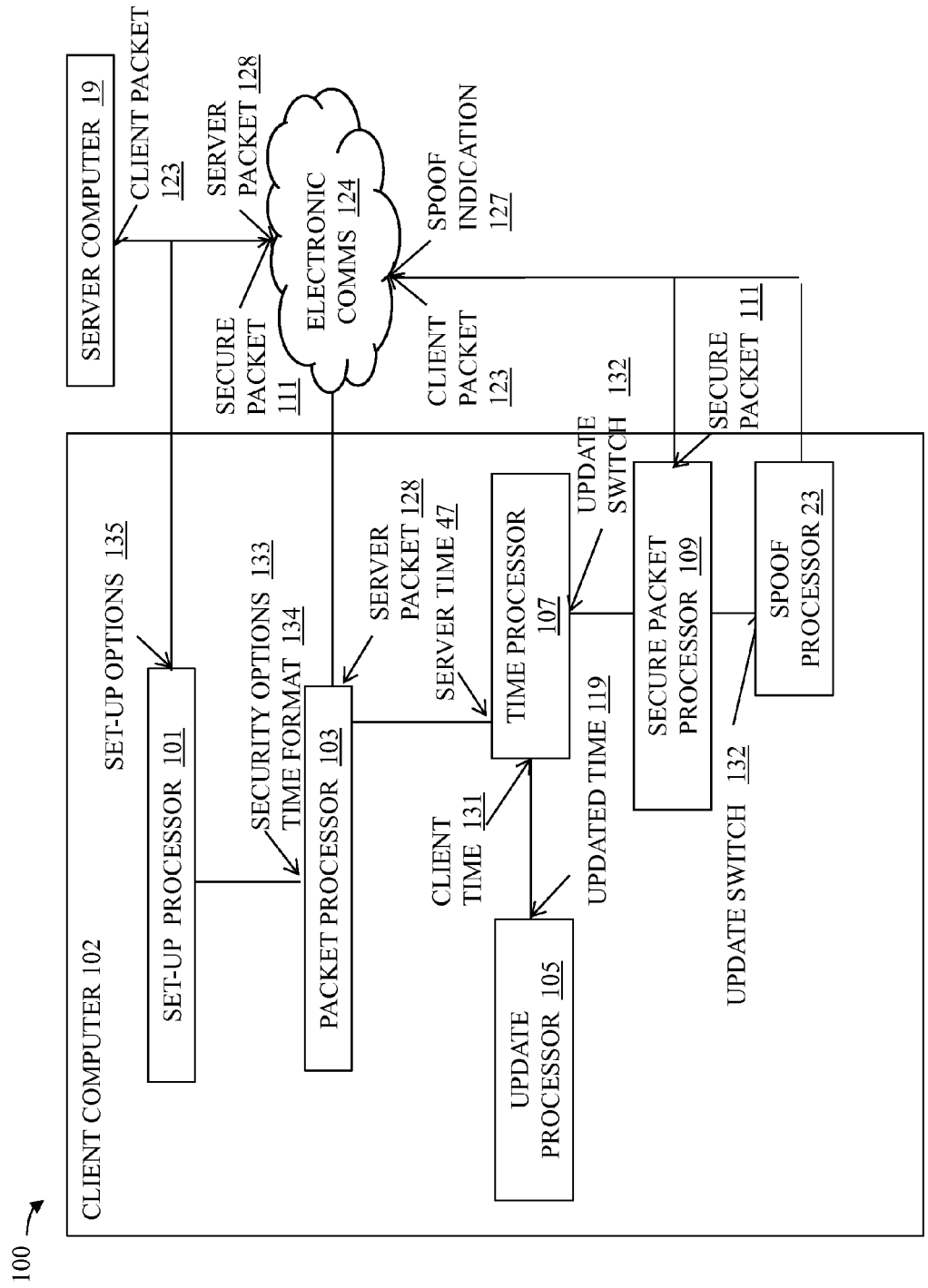
FIG. 7 is a schematic block diagram of one embodiment of the system of the present teachings.

Referring now to FIG. 7, system 100 for minimizing delay in updating client time 131 at client computer 102 can include, but is not limited to including, set-up processor 101 receiving, by client computer 102, set-up information including options 135 from at least one server computer 19. The options could also be indirectly available by, for example, but not limited to, such means as public web pages or internal update mechanisms. System 100 can also include packet processor 103 optionally transmitting, by client computer 102 to at least one server computer 19, client packet 123 including client identification information, timing information, and selected options from options 135. Packet processor 103 can also receive, by client computer 102, server packet 128 including sever time data and at least one server time 47 formatted based on the options or the selected options. System 100 can also include time processor 107 computing, by client computer 102, a time difference between at least one server time 47 and client time 131, and secure packet processor 109 receiving, by client computer 102, a secure version 111 of server packet 128, secure version 111 including secure time data. System 100 can also include update processor 105 updating, by client computer 102, time 131, creating updated time 119, based on the time difference only if the secure time data and the server time data associated with the at least one server time 47 match. Security options 133 can include an encryption method and a decryption key. Secure packet processor 109 can also decrypt the secure version according to the decryption key. The decrypted secure version can include decrypted client information. Update processor 105 can update, by client computer 102, time 131 based on the time difference only if the decrypted time and at least one server time 47 match, and if the received client identification information and the decrypted client identification information match indicated by, for example, but not limited to, update switch 132. System 100 can optionally include spoof processor 23 indicating, by client computer 102, a possible spoof using, for example, but not limited to, spoof indication 127, when the secure version 111 and server packet 128 do not match indicated by, for example, but not limited to, update switch 132. Options can include an encryption method, a decryption key, and time format 134. Secure packet processor 109 can optionally decrypt secure version 111 according to the decryption key. The decrypted secure version can include decrypted client identification information. Update processor 105 can optionally update, by client computer 102, client time 131 based on the time difference only if the decrypted time and at least one server time 47 match, and if the received client identification information and the decrypted client identification information match.

Figure 8:
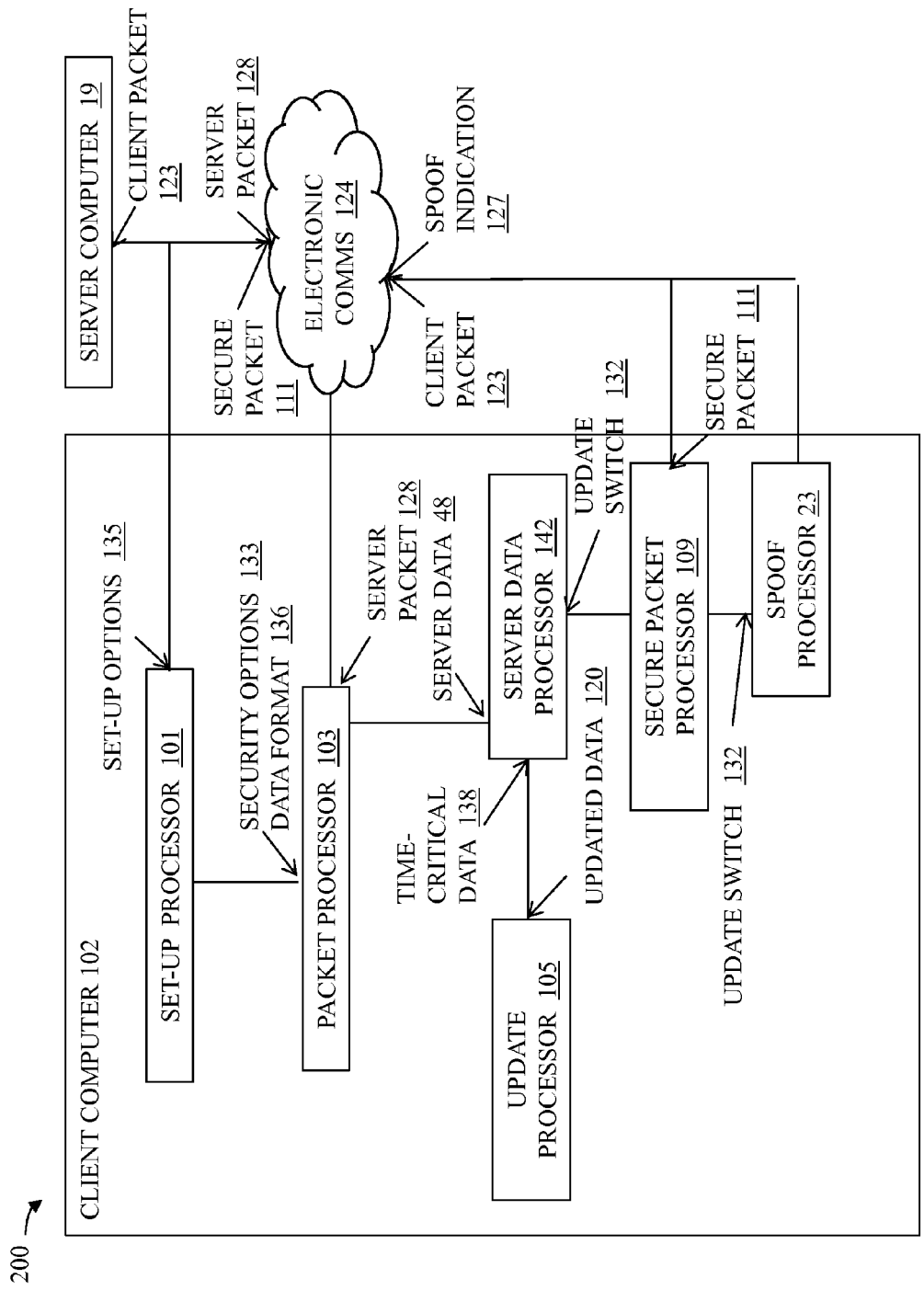
FIG. 8 is a schematic block diagram of another embodiment of the system of the present teachings.

Referring now to FIG. 8, system 200 for circumventing spoofing of time-critical data 138 at client computer 102 can include, but is not limited to including, set-up processor 101 receiving, by client computer 102, set-up information including options 135 from at least one server computer 19. The options could also be indirectly available by, for example, but not limited to, such means as public web pages or internal update mechanisms. System 200 can also include packet processor 103 optionally transmitting, by client computer 102 to at least one server computer 19, client packet 123 including client identification information, timing information, and selected options from options 135. Packet processor 103 can also receive, by client computer 102, server packet 128 including sever time data and server data 48 formatted based on the options or the selected options. System 200 can also include server data processor 142 computing, by client computer 102, at least one difference between server data 48 and time-critical data 138, and secure packet processor 109 receiving, by client computer 102, a secure version 111 of server packet 128, secure version 111 including secure time-critical data. System 200 can also include update processor 105 updating, by client computer 102, time-critical data 138, creating updated data 120, based on the at least one difference only if the secure data and server data 48 match. Security options 133 can include an encryption method and a decryption key. Secure packet processor 109 can also decrypt the secure version according to the decryption key. The decrypted secure version can include decrypted client information. Update processor 105 can update, by client computer 102, time-critical data 138 based on the at least one difference only if the decrypted time and server data 48 match, and if the received client identification information and the decrypted client identification information match indicated by, for example, but not limited to, update switch 132. System 200 can optionally include spoof processor 23 indicating, by client computer 102, a possible spoof using, for example, but not limited to, spoof indication 127, when the secure version 111 and server packet 128 do not match indicated by, for example, but not limited to, update switch 132. Options can include an encryption method, a decryption key, and data format 136. Secure packet processor 109 can optionally decrypt secure version 111 according to the decryption key. The decrypted secure version can include decrypted client identification information. Update processor 105 can optionally update, by client computer 102, time-critical data 138 based on the at least one difference only if the decrypted data and server data 48 match, and if the received client identification information and the decrypted client identification information match.

Embodiments of the present teachings are directed to computer systems such as system 100 (FIG. 7) and system 200 (FIG. 8) for accomplishing the methods such as method 150 (FIG. 5) and method 250 (FIG. 6) discussed in the description herein, and to computer readable media containing programs for accomplishing these methods. The raw data and results can be stored for future retrieval and processing, printed, displayed, transferred to another computer, and/or transferred elsewhere. Communications links such as electronic communications 124 (FIG. 7) can be wired or wireless, for example, using cellular communication systems, military communications systems, and satellite communications systems. In an exemplary embodiment, the software for the system is written in FORTRAN and C. The system can operate on a computer having a variable number of CPUs. Other alternative computer platforms can be used. The operating system can be, for example, but is not limited to, LINUX®.

The present teachings are also directed to software for accomplishing the methods discussed herein, and computer readable media storing software for accomplishing these methods. The various modules described herein can be accomplished on the same CPU, or can be accomplished on different computers. In compliance with the statute, the present embodiment has been described in language more or less specific as to structural and methodical features. It is to be understood, however, that the present embodiment is not limited to the specific features shown and described, since the means herein disclosed comprise forms of putting the present teachings into effect.

Methods such as method 150 (FIG. 5) and method 250 (FIG. 6) of the present teachings can be, in whole or in part, implemented electronically. Signals representing actions taken by elements of the system and other disclosed embodiments can travel over at least one live communications network 124 (FIG. 7). Control and data information can be electronically executed and stored on at least one computer-readable medium. System 100 (FIG. 7) and system 200 (FIG. 8) can be implemented to execute on at least one computer node in at least one live communications network 124 (FIG. 7). Common forms of at least one computer-readable medium can include, for example, but not be limited to, a floppy disk, a flexible disk, a hard disk, magnetic tape, or any other magnetic medium, a compact disk read only memory or any other optical medium, punched cards, paper tape, or any other physical medium with patterns of holes, a random access memory, a programmable read only memory, and erasable programmable read only memory (EPROM), a Flash EPROM, or any other memory chip or cartridge, or any other medium from which a computer can read. Further, the at least one computer readable medium can contain graphs in any form including, but not limited to, Graphic Interchange Format (GIF), Joint Photographic Experts Group (JPEG), Portable Network Graphics (PNG), Scalable Vector Graphics (SVG), and Tagged Image File Format (TIFF).

Although the present teachings have been described with respect to various embodiments, it should be realized these teachings are also capable of a wide variety of further and other embodiments.

What is claimed is:

1. A method for minimizing delay in updating a client time at a client computer, the method comprising:
    receiving, using a client processing device, set-up information from a server, wherein the set-up information comprises an encryption method and a decryption key;
    receiving, using the client processing device, an unencrypted Network Time Protocol (NTP) packet from the server, wherein the NTP packet includes server time data and at least one server time formatted based on at least the set-up information;
    determining, using the client processing device, a time difference between the client time and the at least one server time in the unencrypted NTP packet;
    receiving, using the client processing device, an encrypted version of the NTP packet from the server, the encrypted version including secure time data;
    decrypting the encrypted version of the NTP packet according to the decryption key, the decrypted NTP packet including decrypted client identification information and at least one decrypted time; and
    updating, using the client processing device, the client time based on the time difference in response to determining that secure time data and server time data associated with the at least one server time match.

2. The method as in claim 1, further comprising:
updating, using the client processing device, the client time based on the time difference in response to determining that:
the at least one decrypted time and the at least one server time match, and
the received client identification information and the decrypted client identification information match.

3. The method as in claim 1, wherein the encrypted version of the NTP packet is signed.

4. The method as in claim 3, further comprising:
verifying the unencrypted NTP packet against the signed encrypted version of the NTP packet.

5. The method as in claim 1, further comprising:
updating, using the client processing device, the client time based on the time difference in response to determining that:
the client time and the at least one server time match, and
all other information in the decrypted version of the NTP packet and the unencrypted NTP packet match.

6. The method as in claim 5, further comprising:
determining that a possible spoof has occurred in response to determining that the decrypted version of the NTP packet does not match the unencrypted NTP packet.

7. The method as in claim 1, wherein the NTP packet further includes a receive timestamp and a transmit timestamp.

8. The method as in claim 7, wherein determining the time difference comprises:
determining the time difference based on the equation $0.5*(SR+ST-CR-CT)$, wherein SR is the receive timestamp, ST is the transmit timestamp, CR is a destination timestamp, and CT is an origin timestamp.

9. The method as in claim 7, wherein the NTP packet further includes:
root delay information;
root dispersion information;
a reference identifier;
a reference timestamp;
an origin timestamp;
a receive timestamp;
a transmit timestamp;
a key identifier; and
a message digest.

10. A method for circumventing spoofing of time-critical data, the method comprising:
receiving, using a client processing device, set-up information from a server, wherein the set-up information comprises an encryption method and a decryption key;
receiving, using the client processing device, an unencrypted server packet from the server, wherein the unencrypted server packet includes server data formatted based on the set-up information;
determining, using the client processing device, at least one difference between the server data and a time-critical data;
receiving, using the client processing device, an encrypted version of the unencrypted server packet from the server, the encrypted version including secure time-critical data;
decrypting the encrypted version of the unencrypted server packet according to the decryption key, the decrypted server packet including decrypted client information; and updating, using the client processing device, the time-critical data based on the at least one difference in response to determining that the secure time-critical data and the server data match.

11. The method as in claim 10, further comprising:
transmitting, by the client processing device to the at least one server, a client packet including client identification information, timing information, and selected options.

12. The method as in claim 11, wherein the set-up information comprises an encryption method and a decryption key.

13. The method as in claim 12, further comprising:
updating the time-critical data based on the at least one difference in response to determining that:
the decrypted data and the server data match, and
the received client identification information and the decrypted client identification information match; and
determining that a possible spoof has occurred in response to determining that the decrypted version of the server packet does not match the unencrypted server packet.

14. A system for minimizing delay in updating at least one client time at a client computer, the system comprising:
a memory;
a set-up processor configured to receive set-up information from a server, the set-up information comprising an encryption method and a decryption key;
a packet processor configured to receive an unencrypted server packet from the server, wherein the server packet includes server time data and at least one server time formatted based at least on the set-up information;
a time processor configured to determine a time difference between the client time and the at least one server time;
a secure packet processor configured to:
receive an encrypted version of the server packet from the server, the encrypted version including secure time data, and
decrypt the encrypted version of the server packet according to the decryption key, the decrypted server packet comprising decrypted data including decrypted client identification information and at least one decrypted time; and
an update processor configured to update the client time based on the time difference in response to determining that the secure time data and the server time data associated with the a least one server time match.

15. The system as in claim 14,
wherein the update processor is further configured to:
update the client time based on the time difference in response to determining that the at least one decrypted time and the at least one server time match.

16. The system as in claim 14, further comprising:
a spoof processor configured to determine that a possible spoof has occurred in response to determining that the encrypted version of the server packet does not match the unencrypted server packet.

17. The system as in claim 14, wherein the packet processor is further configured to:
transmit a client packet including client identification information, timing information, and selected options from the set-up information.

* * * * *